(12) United States Patent
James et al.

(10) Patent No.: US 7,872,057 B2
(45) Date of Patent: Jan. 18, 2011

(54) DUAL CURE COMPOSITION

(75) Inventors: David James, Hassleholm (SE); Kent Sörensen, Perstorp (SE); Henrik Bernquist, Helsingborg (SE)

(73) Assignee: Perstorp Specialty Chemicals AB, Perstorp (SE)

( * ) Notice: Subject to any disclaimer, the term of this patent is extended or adjusted under 35 U.S.C. 154(b) by 108 days.

(21) Appl. No.: 12/090,824

(22) PCT Filed: Oct. 2, 2006

(86) PCT No.: PCT/SE2006/001104

§ 371 (c)(1),
(2), (4) Date: Oct. 14, 2008

(87) PCT Pub. No.: WO2007/046741

PCT Pub. Date: Apr. 26, 2007

(65) Prior Publication Data

US 2009/0069459 A1 Mar. 12, 2009

(30) Foreign Application Priority Data

Oct. 18, 2005 (SE) ................................. 0502298-3

(51) Int. Cl.
*C09D 4/00* (2006.01)
*C08G 18/04* (2006.01)
*C08G 69/00* (2006.01)
*C08G 73/00* (2006.01)

(52) U.S. Cl. ............................. 522/40; 522/46; 522/48; 522/64; 522/79; 522/80; 522/84; 522/173; 522/174; 522/167; 522/182; 522/183

(58) Field of Classification Search ................. 522/174, 522/182, 183, 179, 173, 40, 46, 48, 64, 79, 522/80, 84
See application file for complete search history.

(56) References Cited

U.S. PATENT DOCUMENTS

| 4,212,901 | A | 7/1980 | Van Neerbos et al. |
| 6,716,891 | B1 * | 4/2004 | Meisenburg et al. ........... 522/90 |
| 6,727,316 | B1 | 4/2004 | Bremser |
| 6,903,145 | B2 * | 6/2005 | Nienhaus et al. ............. 522/174 |
| 6,949,591 | B1 * | 9/2005 | Allard et al. ................... 522/96 |
| 7,034,063 | B2 * | 4/2006 | Nienhaus et al. ............. 522/91 |
| 7,601,765 | B2 * | 10/2009 | Rink et al. ................... 522/153 |
| 2003/0181590 | A1 | 9/2003 | Lettmann et al. |
| 2003/0191272 | A1 | 10/2003 | Flosbach et al. |

FOREIGN PATENT DOCUMENTS

WO WO 2004/050731 A1 6/2004

OTHER PUBLICATIONS

International Search Report dated Feb. 7, 2007.

* cited by examiner

*Primary Examiner*—Susan W Berman
(74) *Attorney, Agent, or Firm*—Novak, Druce & Quigg LLP

(57) ABSTRACT

A liquid radiation and thermally curing composition characterized in, that said composition comprises at least one ester between at least one tri or polyalcohol and acrylic and/or methacrylic acid, which ester has at least two hydroxyl groups, at least one acrylic or methacrylic double bond, a hydroxyl value of 50-500 mg KOH/g and a double bond concentration of 1-10 mmoles/g, at least one crosslinking agent for hydroxyl functional compounds, which crosslinking agent optionally has at least one olefinic double bond, and an additive package comprising at least one photoinitiator, radical scavenger, light stabilizer, wetting agent and/or leveling agent, and optionally at least one monomeric or oligomeric reactive diluent.

33 Claims, No Drawings

DUAL CURE COMPOSITION

CROSS-REFERENCE TO RELATED APPLICATIONS

This application is a 35 U.S.C. 371 National Stage of PCT/SE2006/001104 filed on Oct. 2, 2006, which claims priority from Swedish Patent Application No. 0502298-3 filed on Oct. 18, 2005, the entire disclosures of which are hereby incorporated by reference.

The invention relates to a novel radiation and thermally curing (dual cure) composition, which advantageously can be used in for instance the production of automotive clear coats or top coats.

The term "dual cure composition" means herein a composition being curable by free-radical polymerisation, such as by UV irradiation, and by thermally induced polyaddition or polycondensation with participation of hydroxyl groups.

Dual cure compositions are known from for instance:

U.S. Pat. No. 4,212,901 disclosing compositions comprising (i) a polyester resin esterified with (meth)acrylic acid, (ii) a vinyl compound, such as polyethylene glycol diacrylate or diallyl adipate, (iii) a polyisocyanate, and (iv) a photoinitiator, US published patent application no. 2003/181,590 disclosing a nonaqueous material curable thermally or thermally and with actinic radiation, which material comprises (i) a hydroxyl containing polyester, (ii) a hydroxyl containing (meth)acrylate copolymer prepared in the presence of said polyester (i), (iii) a crosslinking polyisocyanate and (iv) a linear hydrophobic polyester, and published International application no. WO 03/087246 disclosing dual cure coating compositions distinguished by good compatibility with other binders, reactive diluents, solvents and crosslinking agents and comprising (i) a polyester urethane having olefinic double bonds, (ii) a binder other than said urethane (i) and/or a reactive diluent and (iii) a crosslinking agent for hydroxyfunctional compounds.

It has so far with prior art dual cure compositions not satisfactorily been possible to obtain acceptable combined hardness, solvent resistance, acid resistance, scratch and mar resistance properties on all surface zones of three-dimensional substrates of complicated geometry, such as automotive bodies. The properties of prior art dual cure compositions are, due to the combination of thermal and UV curing, excellent in surface zones directly accessible to UV radiation while the properties in the shaded areas which have only been cured thermally is poor, in particular hardness is inadequate in these areas.

There is a requirement to find dual cure compositions which do not exhibit said known drawbacks and exhibit satisfactory properties when cured only thermally and excellent properties when cured both thermally and by UV irradiation.

The present invention provides a dual cure composition which quite unexpectedly meets said requirements. The dual cure composition of the present invention comprises (a) at least one partially acrylated tri or polyalcohol, that is at least one ester between at least one tri or polyalcohol and acrylic and/or methacrylic acid, which ester has at least two hydroxyl groups and at least one acrylic or methacrylic double bond, preferably at least two acrylic and/or methacrylic double bonds, said component (a) being present in for instance an amount of 40-99%, such as 50-80%, by weight, (b) at least one crosslinking agent for hydroxyl compounds, which crosslinking agent optionally has at least one olefinic double bond, said component (b) being present in for instance an amount of 1-60%, such as 5-30%, by weight, (c), an additive package comprising at least one photoinitiator, radical scavenger, light stabiliser, wetting agent and/or levelling agent, and optionally (d) at least one monomeric or oligomeric reactive diluent being present in an amount of for instance 0-30% by weight. Tri and polyalcohols are herein after to be understood as linear or branched, aliphatic, cycloaliphatic or aromatic tri and polyhydric alcohols, dimers, trimers and polymers thereof as well as alkoxylated species thereof, that is tri and polyhydric alcohols comprising units from one or more alkylene oxides.

Said component (a) has in preferred embodiments thereof a hydroxyl value of 50-500, such as 80-350 mg KOH/g, a double bond concentration of 1-10, such as 2-8, mmoles/g and/or a number average molecular mass of 100-15000, such as 200-6000. Component (a) is, in embodiments of the composition of the present invention, preferably selected from the group consisting of a monoacrylate and/or methacrylate of a 2-alkyl-2-hydroxyalkyl-1,3-propanediol, a mono or diacrylate and/or methacrylate of a 2,2-dihydroxyalkyl-1,3-propanediol, a mono or diacrylate and/or methacrylate of a dimer of a 2-alkyl-2-hydroxyalkyl-1,3-propanediol, a mono, di, tri or tetraacrylate and/or methacrylate of a dimer of a 2,2-dihydroxyalkyl-1,2-propanediol, a mono, di, tri or tetraacrylate and/or methacrylate of a trimer of a 2-allyl-2-hydroxyalkyl-1,3-propanediol or mono, di, tri, tetra, penta or hexaacrylate and/or methacrylate of a trimer of a 2,2-dihydroxyalkyl-1,3-propanediol. Embodiments of component (a) can suitably be exemplified by trimethylolpropane monoacrylate or methacrylate, pentaerythritol diacrylate and/or methacrylate, ditrimethylolpropane diacrylate and/or methacrylate, dipentaerythritol diacarylate and/or methacrylate, dipentaerythritol triacrylate and/or methacrylate, dipentaerythritol tetraacrylate and/or methacrylate, tripentaerythritol tetraacrylate and/or methacrylate or tripentaerythritol hexaacrylate and/or hexamethacrylate.

Further preferred embodiments of component (a) include monoacrylates and/or methacrylates of polyalkoxylated 2-alkyl-2-hydroxyalkyl-1,3-propanediols, mono and diacrylates and/or methacrylates of polyalkoxylated 2,2-dihydroxyalkyl-1,3-propanediols, mono and diacrylates and/or methacrylates of polyalkoxylated dimers of 2-alkyl-2-hydroxyalkyl-1,3-propanediols, mono, di, tri and tetraacrylates and/or methacrylates of polyalkoxylated dimers of 2,2-dihydroxyalkyl-1,2-propanediols, mono, di, tri and tetraacrylates and/or methacrylates of polyalkoxylated trimers of 2-alkyl-2-hydroxyalkyl-1,3-propanediols and mono, di, tri, tetra, penta and hexaacrylates and/or methacrylates of polyalkoxylated trimers of 2,2-dihydroxyalkyl-1,3-propanediols. Said embodiments can be exemplified by monoacrylates and methacrylates of polyalkoxylated trimethylolpropane, diacrylates and/or methacrylates of polyalkoxylated pentaerythritol, diacrylates and/or methacrylates of polyalkoxylated ditrimethylolpropane, diacrylates and/or methacrylates of polyalkoxylated dipentaerythritol, triacrylates and/or methacrylates of polyalkoxylated dipentaerythritols, tetraacrylates and/or methacrylates of polyalkoxylated tripentaerythritol and hexaacrylates and/or methacrylates of polyalkoxylated tripentaerythritol. Polyalkoxylated is here most preferably polyethoxylated and/or polypropoxylated.

Embodiments of said component (a) may furthermore include compounds such as monoacrylates and methacrylate of trimethylolpropane polycarbonates, diacrylates and/or methacrylates of pentaerythritol polycarbonates, diacrylates and/or methacrylates of ditrimethylolpropane polycarbonates and di, tri and tetraacrylates and/or methacrylates of dipentaerythritol polycarbonates and/or acrylated and/or methacrylated dendritic polyalcohols. Dendritic polyalcohols are three dimensional molecules having a tree-like structure and are typically built up from a nucleus or initiator molecule having one or more reactive groups, such as hydroxyl and/or epoxide groups, to which groups one or more generations of a chain extender, such as a saturated or unsaturated hydroxyfunctional carboxylic acid or an oxetane, are added. Acrylates and/or methacrylates having so high a molecular weight that good properties are obtained, but so low a viscosity that conventional solvents are unnecessary can be prepared from dendritic polyalcohols. Suitable dendritic polyalcohols are disclosed in for instance WO 93/17060, WO 93/18079, WO 96/07688, WO 96/12754, WO 99/00439, WO 99/00440, WO 00/56802 and WO 02/40572.

Component (a), including dendritic species thereof, can be produced by conventional procedures known to the person skilled in the art by for instance reacting acrylic and/or methacrylic acid with a tri or polyalcohol in the presence of for instance azeotropic solvents, inhibitors and catalysts.

Component (b) of the composition of the present invention is in embodiments a di, tri or polyisocyanate, such as nonane triisocyanate, hexamethylene diisocyanate, tetramethylxylylene diisocyanate, 1,6-hexane diisocyanate, trimethylhexane diisocyanate, 1,12-dodecane diisocyanate, cyclohexane diisocyanate, isophorone diisocyanate, bis(cyclohexylmethane)diisocyanate, tris(6-isocyanatohexyl)biuret, isophorone diisocyanate isocyanurate and/or hexane diisocyanate isocyanurate, which di, tri or polyisocyanate optionally has blocked NCO-groups. Suitable blocking agents for di, tri and polyisocyanates are for example CH-acidic, NH-, SH- and OH-functional blocking agents. Component (b) is in these embodiments most preferably a free di, tri or polyisocyanate as previously disclosed, whereby the dual cure composition is prepared shortly before use by mixing separately stored components.

Isocyanate acrylate compounds are urethane prepolymers which may be produced in a conventional manner known to the person skilled in the art by reacting aliphatic, cycloaliphatic and/or araliphatic polyisocyanates with compounds comprising at least one group capable of addition to isocyanate groups, such as hydroxyl groups, primary or secondary amino groups, and at least one olefinic double bond, such as (meth)acryloyl groups, optionally together with compounds comprising at least two groups capable of addition to isocyanate groups, such as hydroxyl groups and primary or secondary amino groups. Reaction is here performed with complete consumption of groups capable of addition to isocyanate groups.

Further embodiments of said component (b) include amino resins, such as urea- and/or melamine-formaldehyde resins, alkanol, such as $C_1$-$C_4$ alkanol, etherified urea- and/or melamine-formaldehyde resins and transesterification cross linking agents, such as a tris(alkoxycarbonylamino)triazines.

The additive package of the radiation and thermally curing composition of the present invention comprises in preferred embodiments a photoinitiator selected from the group consisting of benzoin or a derivative thereof, acetophenone or a derivative thereof, such as 2,2-diacetoxyacetophenone, benzophenone or a derivative thereof, thioxanthone or a derivative thereof, anthraquinone, 1-benzoylcyclohexanol, and an organophosphorus compound, such as an acylphosphine oxide, in an amount of for instance 0.1-5%, such as 0.5-3%, by weight calculated on the solid resin content.

In addition to said photoinitiator, the additive package may comprise additives conventionally used in for instance coatings, including levelling agents, rheological agent, such as pyrogenic silica, reaction products comprising urea groups and being prepared from amines and polyisocyanates (so called "sag control agents"), inhibitors suppressing premature free-radical polymerisation, thermal free-radical initiators, catalysts, dyes, light stabilisers, UV-absorbers, antioxidants, polymer microparticles, such as microgels, nanoparticles, such as silica, and/or formaldehyde-releasing substances.

Said optional component (d) comprises in preferred embodiments suitably a reactive diluent having olefinic double bonds, which may also be used as inert diluent in the synthesis of component (a). Said reactive diluent may be mono, di or polyunsaturated and can be exemplified by compounds such as acrylate and/or methacrylate esters, vinylacrylates and/or methacrylates, allylacrylates and/or methacrylates, methallylacrylates and/or methacrylates, polyester acrylates and/or methacrylates, epoxy acrylates and/or methacrylates, urethane acrylates and/or methacrylates and melamine acrylates and/or methacrylates. Said reactive diluent is suitably selected from the group consisting of an acrylate and/or methacrylate ester of a 2-alkyl-1,3-propanediol, a 2,2-diallyl-1,3-propanediol, a 2-alkyl-2-hydroxyalkyl-1,3-propanediol, a 2,2-dihydroxyalkyl-1,3-propanediol, a polyalkoxylated 2-alkyl-1,3-propanediol, a polyalkoxylated 2,2-dialkyl-1,3-propanediol, a polyalkoxylated 2-alkyl-2-hydroxyalkyl-1,3-propanediol and/or a polyalkoxylated 2,2-dihydroxyalkyl-1,3-propanediol, wherein alkyl is $C_1$-$C_8$ linear or branched alkanyl and polyalkoxylated is polyethoxylated, polypropoxylated and/or polybutoxylated having 1-20 alkoxy units.

The reactive diluent of component (d) is in especially preferred embodiments of the present invention 1,3-butanediol diacrylate and/or methacrylate, dipropylene glycol diacrylate and/or methacrylate, hexanediol diacrylate and/or methacrylate, neopentyl glycol diacrylate and/or methacrylate, 2-butyl-2-ethyl-1,3-propanediol diacrylate and/or methacrylate, glycerol triacrylate and/or methacrylate, trimethylolpropane triacrylate and/or methacrylate, pentaerythritol tetraacrylate and/or methacrylate, dipentaerythritol tetraacrylate and/or methacrylate, dipentaerythritol hexaacrylate and/or methacrylate, diacrylates and/or methacrylates of polyalkoxylated neopentyl glycol, diacrylates and/or methacrylates of polyalkoxylated 2-butyl-2-ethyl-1,3-propanediol, triacrylates and/or methacrylates of polyalkoxylated glycerol, triacrylates and/or methacrylates of polyalkoxylated trimethylolpropane, tetraacrylates and/or methacrylates of polyalkoxylated pentaerythritol and hexaacrylates and/or methacrylates of polyalkoxylated dipentaerythritol. Polyalkoxylated is here preferably polyethoxylated and/or polypropoxylated. Further suitable embodiments of component (d) include vinyl, allyl and/or methallyl ethers, styrene, vinyl toluene and/or divinylbenzene.

Depending on the intended application, the composition of the present invention can be without pigment(s) or fully, transparently or opaquely pigmented. Said composition can thus additionally and optionally comprise at least one pigment, filler and/or extender in a weight ratio solid resins to said pigment, filler and/or extender of between for example 0.1:1 and 3:1. Examples of inorganic or organic colour imparting pigments include titanium dioxide, micronised titanium dioxide, iron oxide pigments, carbon black, azo pigments, phthalocyanine pigments, quinacridone and pyrrolopyrrole pigments. Examples of effect imparting pigments include metal pigments, such as aluminium and other metal pigments, and/or interference pigments, such as metal oxide coated metal pigments, for example titanium dioxide or mixed oxide coated aluminium, coated mica, for example titanium dioxide coated mica. Suitable extenders can be exemplified by silicon dioxide, aluminium silicate, barium sulphate, calcium carbonate and talcum.

The dual cure composition of the present invention can suitably be prepared having a solids content of for instance 60-100% by weight, calculated as solid resins, non-volatile additives and optional pigments, fillers and/or extenders. The volatile constituents they comprise organic solvents and/or water, optionally together with volatile additives.

Conversion into aqueous form may be performed in conventional manners known to persons skilled in the art by neutralisation of neutralisable groups and/or by the addition of nonionic emulsifiers. Organic solvents may be removed before or after addition of water, for example by distillation.

Organic solvents suitable for dilution of the dual cure compositions of the present invention include glycol ethers, such as ethylene glycol monobutyl ether, diethylene glycol monobutyl ether, dipropylene glycol dimethyl ether, dipropylene glycol monomethyl ether, ethylene glycol mad/or dimethyl ether, glycol ether esters, such as ethylene glycol monoethyl ether acetate, ethylene glycol monobutyl ether acetate, diethylene glycol monobutyl ether acetate and/or methoxypropyl acetate, esters, such as butyl acetate, isobutyl acetate and/or amyl acetate, ketones, such as methyl ethyl ketone, methyl isobutyl ketone, diisobutyl ketone, cyclohexanone mad/or isophorone, alkanols, such as methanol, ethanol, propanols and butanols, and/or aliphatic, cycloaliphatic and aromatic hydrocarbons.

The dual cure compositions of the present invention may, for example, be used in the production of multilayer coatings for coating of any desired substrate, such as metals, plastics, composite substrates made of for instance metals and plastics, and in particular for the production of outdoor pigmented top coats, transparent clear coats or transparent sealing coats and multilayer coatings. An outdoor coating layer may, for example, be applied by the wet-on-wet process onto a prior coating applied onto a substrate, whereafter the two layers are cured together. Non-aqueous dual cure coatings may preferably be applied as transparent clear coats on layers of waterborne or solvent borne coatings and/or colour and effect imparting base coats. The dual cure composition of the present invention is also suitable in the production of primers for application on substrates such as fibre reinforced plastics. The dual cure composition is in especially suitable for the production of the above mentioned multilayer coatings for original and repair coatings of automotive bodies and body parts.

Coatings obtained from the dual cure compositions of the present invention exhibit, when cured thermally as well as by UV irradiation, excellent solvent resistance, acid resistance, mar resistance and hardness and has very good optical properties. Very good optical properties and mar resistance combined with satisfactory solvent resistance, acid resistance and hardness are obtained when the composition is thermally cured only. The dual cure composition of the present invention is thus particularly suitable for coating of three-dimensional substrates having a complicated shape with surface areas varying in accessibility or even being inaccessible to irradiation with for instance UV radiation, such as automotive bodies and body parts.

These and other objects and the attendant advantages will be more fully understood from the following detailed description, taken in conjunction with appended Examples, wherein Examples 1 and 2 refer to preparation of partially acrylated polyalcohols, embodiments of said Component (a) and Examples 3 and 4 and Table 1 to preparation and evaluation of clear coatings based on embodiments of the dual cure composition of the present invention.

EXAMPLE 1

100 g of ditrimethylolpropane, 137 g of acrylic acid, 0.37 g of methoxyphenol, 2.3 g of methane sulphonic acid and 200 g of toluene were charged in a reaction vessel equipped with an agitator, a thermometer, oxygen inlet and an azeotropic distillation column. The mixture was heated to reflux ($\approx$110° C.) and stirred until 10 ml of water was collected. The reaction mixture was now cooled to room temperature and excess of acrylic acid was neutralised with a 10% aqueous NaOH solution. The organic phase was separated and washed twice with water. Toluene was finally removed under vacuum (30 mm Hg).

The obtained product had following characteristics:

| | |
|---|---|
| Hydroxyl value, mg KOH/g | 331 |
| Double bond equivalents, mmoles/g | 5.3 |
| Colour, APHA | 50 |
| Viscosity at 23° C., Pas | 2.3 |

EXAMPLE 2

250 g of a hydroxyfunctional dendritic polyester (Boltorn® H20, Perstorp Specialty Chemicals AB), 200 g of acrylic acid, 0.5 g of methoxyphenol, 3.5 g of methane sulphonic acid and 400 g of toluene, were charged in a reaction vessel equipped with an agitator, a thermometer, oxygen inlet and an azeotropic distillation column. The mixture was heated to reflux ($\approx$110° C.) and stirred until 30 ml of water was collected. The mixture was now cooled to room temperature and excess of acrylic acid was neutralised with a 10% aqueous NaOH solution. The organic phase was separated and washed twice with water. Toluene was finally removed under vacuum (30 mm Hg).

The obtained product had following characteristics:

| | |
|---|---|
| Hydroxyl value, mg KOH/g | 99 |
| Double bond equivalents, mmoles/g | 4.4 |
| Colour, APHA | 210 |
| Viscosity at 23° C., Pas | 120 |

EXAMPLE 3

Clear coatings were prepared based on embodiments (Formulations nos. 1 and 2) of the present invention and comprising the products (components a) obtained in Examples 1 and 2. A 2-pack isocyanate curing coating and a dual cure coating was prepared as references. The coatings were prepared at 40° C. and coated on glass panels at a film thickness of $\approx$40 µm dry film. The coatings were either thermally cured in an oven or thermally and UV cured. Formulations, in parts by weight, and properties obtained are given in Table 1 below.

EXAMPLE 4

The coating formulations of Example 3 were coated as automotive top coatings at a film thickness of $\approx$40 µm dry film and cured thermally (30 minutes at 80° C.) and UV cured (200 mJ/cm$^2$ in air using a H bulb). The coatings were subjected to accelerated weathering (QUVA) at a cycle of 4 hours of UV-A at 60° C. followed by 4 hours of condensation at 50° C. All coatings were after 1000 hours exhibiting a gloss retention of more than 95% and a delta E of less than 1 (Delta E is the result of a calculation of the different colour coordinates LAB—where L is lightness, A is the green to red indicator and B the blue to yellow indicator).

TABLE 1

|  | 2 Pack Isocyanate | Reference Dual Cure | Formulation No. 1 | Formulation No. 2 |
|---|---|---|---|---|
| Hexandiol diacrylate | — | 30 | — | — |
| Trimethylolpropane triacrylate | — | 20 | — | — |
| Acryflow ™ M100 *1 | 54 | 13.25 | — | — |
| Acryflow ™ P120 *1 | 17 | 4.12 | — | — |
| Product acc. to Example 1 | — | — | 44 | — |
| Product acc. to Example 2 | — | — | — | 45 |
| Desmodur ® N3600 *2 | 26.2 | 6.44 | 49.73 | 15.2 |
| Dibutyl tinlaurate | 0.003 | 0.003 | 0.003 | 0.003 |
| Irgacure ® 184 *3 | — | 4 | 4 | 4 |
| Irgacure ® 819 *3 | — | 0.5 | 0.5 | 0.5 |
| Tinuvin ® 292 *4 | 1.2 | 1.2 | 1.2 | 1.2 |
| Tinuvin ® 400 *4 | 1 | 1 | 1 | 1 |
| BYK ® 333 *5 | 0.5 | 0.5 | 0.5 | 0.5 |
| Cure without UV irradiation | Yes | No | Yes | Yes |
| Pot life, hours | 3.5 | >10 | >10 | >10 |
| Thermal cure 30 min. at 90° C. without UV irradiation | | | | |
| Pencil hardness | H/2H | — | F/H | HB/B |
| UV irradiation (H bulb - 4 passes at 5 m/min.) and thermal cure (30 min. at 90° C.) | | | | |
| Pencil hardness | — | F/H | 3H/4H | 5H/6H |

*1 Acrylic polyols - Lyondell, USA.
*2 Polyisocyanate resin based on hexamethylene diisocyanate - Bayer AG, Germany
*3 Photoinitiators - Ciba Specialty Chemicals, Switzerland.
*4 UV stabilisers - Ciba Specialty Chemicals, Switzerland.
*5 Surface additive - BYK Chemie, Germany.

The invention claimed is:

1. A liquid radiation and thermally curing composition characterized in that said composition comprises
   a) at least one monoacrylate or monomethacrylate of a 2-alkyl-2-hydroxyalkyl-1,3-propanediol, a mono- or di-acrylate or methacrylate of a 2,2-dihydroxyalkyl-1,3-propanediol, a mono- or di-acrylate or methacrylate of a dimer of a 2-alkyl-2-hydroxyalkyl-1,3-propanediol, a mono-, di-, tri- or tetra-acrylate or methacrylate of a dimer of a 2,2-dihydroxyalkyl-1,2-propanediol, a mono-, di-, tri-, tetra-acrylate or methacrylate of a trimer of a 2-alkyl-2-hydroxyalkyl-1,3-propanediol or mono- di-, tri-, tetra-, penta- or hexa-acrylate or methacrylate of a trimer of a 2,2-dihydroxyalkyl-1,3-propanediol, or an ester between at least one dendritic polyalcohol and acrylic or methacrylic acid,
   b) at least one crosslinking agent for hydroxyl functional compounds, which crosslinking agent optionally has at least one olefinic double bond, and
   c) an additive package comprising at least one photoinitiator, radical scavenger, light stabilizer, wetting agent and/or leveling agent, and optionally
   d) at least one monomeric or oligomeric reactive diluent.

2. A liquid radiation and thermally curing composition according to claim 1 characterized in that said component (a) is present in said composition in an amount of 40-99% by weight.

3. A liquid radiation and thermally curing composition according to claim 1 characterized in that said component (a) is present in said composition in an amount of 30-70% by weight.

4. A liquid radiation and thermally curing composition according to claim 1 characterized in that said component (b) is present in said composition in an amount of 1-60% by weight.

5. A liquid radiation and thermally curing composition according to claim 1 characterized in that said component (b) is present in said composition in an amount of 5-30% by weight.

6. A liquid radiation and thermally curing composition according to claim 1 characterized in that said optional component (d) is present in said composition in an amount of 0-30% by weight.

7. A liquid radiation and thermally curing composition according to claim 1 characterized in that said component (a) has a hydroxyl value of 80-350 mg KOH/g.

8. A liquid radiation and thermally curing composition according to claim 1 characterized in that said component (a) has a double bound concentration of 1-10 mmoles/g.

9. A liquid radiation and thermally curing composition according to claim 1 characterized in that said component (a) is trimethylolpropane monoacrylate or methacrylate, pentaerythritol diacrylate and/or methacrylate, ditrimethylolpropane diacrylate and/or methacarylate, dipentaerythritol diacarylate and/or methacrylate, dipentaerythritol triacrylate and/or methacrylate, dipentaerythritol tetraacrylate and/or methacrylate, tripentaerythritol tetraacrylate and/or methacrylate or tripentaerythritol hexaacrylate and/or hexamethacrylate.

10. A liquid radiation and thermally curing composition according to claim 1 characterized in that said component (a) is a monoacrylate or methacrylate of a polyalkoxylated 2-alkyl-2-hydroxyalkyl-1,3-propanediol, a mono or diacrylate and/or methacrylate of a polyalkoxylated 2,2-dihydroxyalkyl-1,3-propanediol, a mono or diacrylate and/or methacrylate of a polyalkoxylated dimer of a 2-alkyl-2-hydroxyalkyl-1,3-propanediol, a mono, di tri or tetraacrylate and/or methacrylate of a polyalkoxylated dimer of a 2,2-dihydroxyalkyl-1,2-propanediol, a mono, di, tri or tetraacrylate and/or methacrylate of a polyalkoxylated trimer of a 2-alkyl-2-hydroxyalkyl-1,3-propanediol or mono, di, tri, tetra, penta or hexaacrylate and/or methacrylate of a polyalkoxylated trimer of a 2,2-dihydroxyalkyl-1,3-propanediol.

11. A liquid radiation and thermally curing composition according to claim 10 characterized in that said component (a) is a monoacrylate or methacrylate of a polyalkoxylated trimethylolpropane, a diacarylate and/or methacrylate of a polyalkoxylated pentaerythritol, a diacrylate and/or methacrylate of a polyalkoxylated ditrimethylolpropane, diacrylate and/or methacrylate of a polyalkoxylated dipentaerythritol, a triacrylate and/or methacrylate of a polyalkoxylated tripentaerythritol or a hexaacrylate and/or methacrylate of a polyalkoxylated tripentaerythritol.

12. A liquid radiation and thermally curing composition according to claim 10 characterized in that said polyalkoxylated is polyethoxylated and/or polypropoxylated.

13. A liquid radiation and thermally curing composition according to claim 1 characterized in that said component (a) is a monoacrylate or methacrylate of a trimethylolpropane polycarbonate, a diacrylate and/or methacrylate of a pentaerythritol polycarbonate, a diacrylate and/or methacrylate of a ditrimethylolpropane polycarbonate and/or a di, tri or tetraacrylate and/or methacrylate of a dipentaerythritol polycarbonate.

14. A liquid radiation and thermally curing composition according to claim 1 characterized in that said component (b) is a di, tri or polyisocyanate, which di, tri or polyisocyanate optionally has blocked NCO-groups.

15. A liquid radiation and thermally curing composition according to claim 14 characterized in that said di, tri or polyisocyanate is nonane triisocyanate, hexamthylene diisocyanate, tetramethylxylylene diisocyanate, 1,6-hexanediisocyanate, trimethylhexanediisocyanate, 1,12-dodecane diisocyanate, cyclohexane diisocyanate, isophorone diisocyanate, biscyclohexylmethane diisocyanate, tris(6-isocyanatohexyl) biuret, isophornoe diisocyanate isocyanurate and/or hexane diisocyanate isocyanurate.

16. A liquid radiation and thermally curing composition according to claim 1 characterized in that said component (b) is an amino resin.

17. A liquid radiation and thermally curing composition according to claim 16 characterized in that said amino resin is a urea- and/or melamine-formaldehyde resin.

18. A liquid radiation and thermally curing composition according to claim 16 characterized in that said amino resin is a C1-C4 alkanol etherified urea- and/or melamine-formaldehyde resin.

19. A liquid radiation and thermally curing composition according to claim 1 characterized in that said component (b) is a transesterification crosslinking agent.

20. A liquid radiation and thermally curing composition according to claim 19 characterized in that said transesterification crosslinking agent is a tris(alkoxycarbonylamino)triazine.

21. A liquid radiation and thermally curing composition according to claim 1 characterized in that said additive package comprises at least one photoinitiator selected from the group consisting of benzoin or a derivative thereof, acetophenone or a derivative thereof, benzophenone or a derivative thereof, thioxanthone or a derivative thereof, anthraquinon, 1-benzoylcyclohexanol and an oraganophosphorous compound.

22. A liquid radiation and thermally curing composition according to claim 1 characterized in that said additive package comprises at least one leveling agent, theological agent, sag control agent, inhibitor, thermal free-radical initiator, catalyst, dye, light stabilizer, UV absorber, antioxidant, microgel, formaldehyde releasing substance and/or nanoparticles.

23. A liquid radiation and thermally curing composition according to claim 1 characterized in that said optional component (d) is an acrylate and/or methacrylate ester, a vinylacrylate and/or methacrylate, an allylacrylate and/or methacrylate, a polyester acrylate and/or methacrylate, an epoxy acrylate and/or methacrylate, a urethane acrylate and/or methacrylate and/or a melamine acrylate and/or methacrylate.

24. A liquid radiation and thermally curing composition according to claim 23 characterized in that said acrylate and/or methacrylate ester is an acrylate and/or methacrylate ester of a 2-alkyl-1,3-propanediol, a 2,2-dialkyl-1,3-propanediol, a 2-alkyl-2-hydroxyalkyl-1,3-propanediol, a 2,2-dihydroxyalkyl-1,3-propanediol, a polyalkoxylated 2-alkyl-1,3-propanediol, a polyalkoxylated 2,2-dialkyl-1,3-propanediol, a polyalkoxylated 2-alkyl-2-hydroxyalkyl-1,3-propanediol and/or a polyalkoxylated 2,2-dihydroxyalkyl-1,3-propanediol, wherein alkyl is C1-C8 linear or branched alkanyl and polyalkoxylated is polyethoxylated, polypropoxylated and/or polybutoxylated having 1-20 alkoxy units.

25. A liquid radiation and thermally curing composition according to claim 23 characterized in that said acrylate and/or methacrylate ester is 1,3-butanediol diacrylate and/or methacrylate, dipropylene glycol diacrylate and/or methacrylate, hexanediol diacrylate and/or methacrylate, neopentyl glycol diacrylate and/or medthacrylate, 2-butyl-2-ethyl-1,3-propanediol diacrylate and/or methacrylate, glycerol triacrylate and/or methacrylate, trimethylolpropane triacrylate and/or methacrylate, pentaerythritol tetraacrylate and/or methacrylate, dipentaerythritol tetraacrylate and/or methacrylate and/or dipentaerythritol hexaacrylate and/or methacrylate.

26. A liquid radiation and thermally curing composition according to claim 23 characterized in that said acrylate and/or methacrylate ester is a diacrylate and/or methacrylate of a polyalkoxylated neopentyl glycol, a diacrylate and/or methacrylate of a polyalkoxylated 2-butyl-2-ethyl-1,3-propanediol, a triacrylate and/or methacrylate of a polyalkoxylated glycerol, a triacrylate and/or methacrylate of a polyalkoxylated trimethylolpropane, a tetraacrylate and/or methacrylate of a polyalkoxylated pentaerythritol, a tetraacrylate and/or methacrylate of a polyalkoxylated dipentaereythritol and/or a hexaacrylate and/or methacrylate of a polyalkoxylated dipentaerythritol.

27. A liquid radiation and thermally curing composition according to claim 26 characterized in that said polyalkoxylated is polyethoxylated and/or polypropoxylated.

28. A liquid radiation and thermally curing composition according to claim 1 characterized in that said optional component (d) is a vinyl, allyl ether and/or methallyl ether.

29. A liquid radiation and thermally curing composition according to claim 1 characterized in that said optional compoenent (d) is styrene, vinyl toluene and/or divinylbenzene.

30. A liquid radiation and thermally curing composition according to claim 1 characterized in that said composition additional to said components comprises at least one organic solvent and/or water.

31. A liquid radiation and thermally curing composition according to claim 30 characterized in that said organic solvent is a glycol ether, a clycol ether ester, an carboxylic acid ester, a ketone, an alkanol and/or an aliphatic, cycloaliphatic and/or aromatic hydrocarbon.

32. A liquid radiation and thermally curing composition according to claim 30 characterized in that said organic solvent is ethylene glycol monobutyl ether, diethylene glycol monobutyl ether, dipropylene glycol dimethyl ether, dipropylene glycol monomethyl ether, ethylene glycol dimethyl ether, dipropylene glycol monomethyl ether, ethylene glycol dimethyl ether, ethylene glycol monoethyl ether acetate, ethylene glycol monobutyl ether acetate, diethylene glycol monobutyl ether acetate, methoxypropyl acetate, butyl acetate, isobutyl acetate, amyl acetate, methyl ethyl ketone, methyl isobutyl ketone, diisobutyl ketone, cyclohexanone, isophorone, methanol, ethanol, a propanol, a butanol, xylene and/or a white spirit.

33. A liquid radiation and thermally curing composition according to claim 1 characterized in that said composition additional to said components comprises at least one pigment, filler and/or extender.

* * * * *